United States Patent [19]
Sukegawa et al.

[11] Patent Number: 5,502,583
[45] Date of Patent: Mar. 26, 1996

[54] LIQUID CRYSTAL DISPLAY DEVICE CAPABLE OF COMPENSATING FOR A POSITIONING ERROR BETWEEN A DRAIN LINE AND A DISPLAY ELECTRODE

[75] Inventors: Osamu Sukegawa; Hirohumi Ihara, both of Tokyo, Japan

[73] Assignee: NEC Corporation, Tokyo, Japan

[21] Appl. No.: 242,645

[22] Filed: May 13, 1994

[30] Foreign Application Priority Data

May 15, 1993 [JP] Japan ................................. 5-136774

[51] Int. Cl.⁶ ........................................... G02F 1/1343
[52] U.S. Cl. .................................... 359/59; 359/87
[58] Field of Search ........................................ 359/59, 87

[56] References Cited

U.S. PATENT DOCUMENTS

| 5,187,601 | 2/1993 | Yamazaki et al. | 359/87 |
| 5,287,206 | 2/1994 | Kanemori et al. | 359/59 |

FOREIGN PATENT DOCUMENTS

| 62-34130 | 2/1987 | Japan | 359/87 |
| 1-180523 | 7/1989 | Japan | 359/59 |
| 4-107531 | 4/1992 | Japan | 359/87 |
| 5-8586 | 5/1993 | Japan | |

Primary Examiner—William L. Sikes
Assistant Examiner—Charles Miller
Attorney, Agent, or Firm—Popham, Haik, Schnobrich & Kaufman, Ltd.

[57] ABSTRACT

In an active matrix liquid crystal display device incorporates a plurality of thin-film transistors, drain lines, and display electrodes of a conductive material. Compensating lines of the conductive material are wider than the drain lines and are formed on the drain lines simultaneously with the display electrodes. A predetermined distance is defined between the display electrode and the compensating line for each of the thin-film transistors. The predetermined distance is further defined between the display electrode for one of the thin-film transistors and the compensating line for an adjacent one of the thin-film transistors. The adjacent one of the thin-film transistors is nearer to the display electrode for the thin-film transistor in question rather than the drain line for the thin-film transistor in question. The compensating lines compensate for non-uniformity of capacitances between the drain line and the display electrode for the thin-film transistor in question and between the display electrode for the thin-film transistor in question and the drain line for the adjacent one of the thin-film transistors.

4 Claims, 5 Drawing Sheets

LIQUID CRYSTAL DISPLAY DEVICE CAPABLE OF COMPENSATING FOR A POSITIONING ERROR BETWEEN A DRAIN LINE AND A DISPLAY ELECTRODE

BACKGROUND OF THE INVENTION

This invention relates to a liquid crystal display device and, more particularly, to an active matrix liquid crystal display device.

As will later be described, a conventional active matrix liquid crystal display device of the type described, comprises a liquid crystal panel. The liquid crystal panel comprises an insulating film and a plurality of thin-film transistors, each of which has a drain electrode and a source electrode.

Each of drain lines is of a first conductive material. The drain lines are formed on the insulating film and connected to the drain electrodes of the thin-film transistors, respectively.

Each of the display electrodes is of a second conductive material which is different from the first conductive material. The display electrodes are formed on the insulating film and connected to the source electrodes of the thin-film transistors, respectively.

Inasmuch as the display electrodes are different in material from the drain lines, the display electrodes and the drain lines are formed at different patterning steps. As a result, positioning errors inevitably occur between the drain lines and the display electrodes. This results in non-uniformity of capacitances between the drain line and the display electrode for one of the thin-film transistors and between the display electrode for the thin-film transistor in question and the drain line for an adjacent one of the thin-film transistors. The adjacent one of the thin-film transistors is nearer the display electrode for the thin-film transistor in question rather than the drain line for the thin-film transistor in question.

Inasmuch as the non-uniformity of the capacitances results in degradation of display quality of the display device, it is required to compensate for the non-uniformity of the capacitances.

In Japanese Utility Model Publication No. B586/1993, another display device is disclosed which comprises auxiliary lines, each of which is of the second conductive material. The auxiliary lines are formed on the drain lines simultaneously with the display electrodes. However, inasmuch as each auxiliary line has the same shape or width as each drain line has, it is difficult to compensate for the non-uniformity of capacitances between the drain line and the display electrode for the thin-film transistor in question and between the display electrode for the thin-film transistor in question and the drain line for the adjacent one of the thin-film transistors that is adjacent to the display electrode for the thin-film transistor in question.

SUMMARY OF THE INVENTION

It is therefore an object of this invention to provide an active matrix liquid crystal display device which can compensate for non-uniformity of capacitances between a drain line and a display electrode for a particular one of thin-film transistors and between the display electrode for the particular one of the thin-film transistors and another drain line for an adjacent one of the thin-film transistors that is nearer to the display electrode for the particular one of the thin-film transistors rather than the drain line for the particular one of the thin-film transistors.

It is another object of this invention to provide an active matrix liquid crystal display device of the type described, which has a high display quality.

Other objects of this invention will become clear as the description proceeds.

According to one aspect of this invention, there is provided an active matrix liquid crystal display device including a glass substrate and a plurality of thin-film transistors formed on the glass substrate in a matrix form. Each of the thin-film transistors comprises a semiconductor film, a gate electrode, a gate insulating film intervening between the gate electrode and the semiconductor film, a first electrode formed in contact with said semiconductor film, a second electrode formed in the semiconductor film apart from the first electrode, a first bus line arranged in a row direction in contact with the gate electrode, a second bus line arranged in a column direction in contact with the first electrode, a display electrode formed in contact with the second electrode along the second bus line apart from the second bus line, and a compensating conductive layer formed in contact with one of the second bus line and the display electrode. The compensating conductive layer has a portion projecting from the above-mentioned one of the second bus line and the display electrode towards the other of the second bus line and the display electrode to thereby keep a distance between the portion of the compensating conductive film and the other of the second bus line and the display electrode constant.

According to another aspect of this invention, there is provided an active matrix liquid crystal display device comprising a liquid crystal panel comprising: an insulating film and; a plurality of thin-film transistors formed on the insulating film. Each of the thin-film transistors has a drain electrode and a source electrode. The panel further includes drain lines, each being of a first conductive material and having a first predetermined width, the drain lines are formed on the insulating film and connected to the drain electrodes of the thin-film transistors, respectively. The panel also includes display electrodes, each being of a second conductive material different from the first conductive material. The display electrodes are formed on the insulating film and connected to the source electrodes of the thin-film transistors, respectively. Lastly, the panel incorporates and compensating lines, each being of the second conductive material and having a second predetermined width greater than the first predetermined width. The compensating lines are formed on the drain lines simultaneously with the display electrodes with both peripheral parts of the compensating line for each of the thin-film transistors formed on the insulating film and with a predetermined distance left between the display electrode and the compensating line for each of the thin-film transistors and between the display electrode for one of the thin-film transistors and the compensating line for an adjacent one of the thin-film transistors. The adjacent one of the thin-film transistors is nearer to the display electrode for the thin-film transistor in question rather than the drain line of the thin film transistor in question. The compensating lines compensate for non-uniformity of capacitances between the drain line and the display electrode for each of the thin-film transistors and between the display electrode for the thin-film transistor in question and the drain line for the adjacent one of the thin-film transistors.

According to still another aspect of this invention, there is provided an active matrix liquid crystal display device comprising a liquid crystal panel comprising: an insulating film; a plurality of thin-film transistors formed on the insulating film, each of the thin-film transistors having a drain electrode and a source electrode; drain lines, each being of a first conductive material, the drain lines being formed on the insulating film and connected to the drain electrodes of the thin-film transistors, respectively; first compensating lines, each being of the first conductive material, the first compensating lines being formed on the insulating film simultaneously with the drain lines with a predetermined distance left between the drain line and the first compensating line for each of the thin-film transistors; second compensating lines, each being of the first conductive material, the second compensating lines being formed on the insulating film simultaneously with the drain lines and the first compensating lines with the second compensating line for each of the thin-film transistors located farther from the drain line for each of the thin-film transistors than the first compensating line for each of the thin-film transistors and with the predetermined distance left between the second compensating line for one of the thin-film transistors and the drain line for an adjacent one of the thin-film transistors, the adjacent one of the thin-film transistors being nearer to the second compensating line for the thin-film transistor in question rather than the drain line for the thin-film transistor in question; and display electrodes, each being of a second conductive material which is different from the first conductive material. The display electrodes are formed on the insulating film and connected to the source electrode of the thin-film transistors, respectively. The display electrode for each of the thin-film transistors is formed on the insulating film so that the display electrode for each of the thin-film transistors is positioned between the first and the second compensating lines for each of the thin-film transistors. The display electrode for each of the thin-film transistors is furthermore formed on the first and the second compensating lines for each of the thin-film transistors so that both peripheral parts of the display electrode for each of the thin-film transistors overlaid on the inner peripheral parts of the first and the second compensating lines for each of the thin-film transistors. The first and the second compensating lines compensate for the non-uniformity of capacitances between the drain line and the display electrode for each of the thin film transistors, and between the display electrode for the thin-film transistor in question and the drain line for the adjacent one of the thin-film transistors.

DESCRIPTION OF THE PREFERRED EMBODIMENTS

Figure 1:
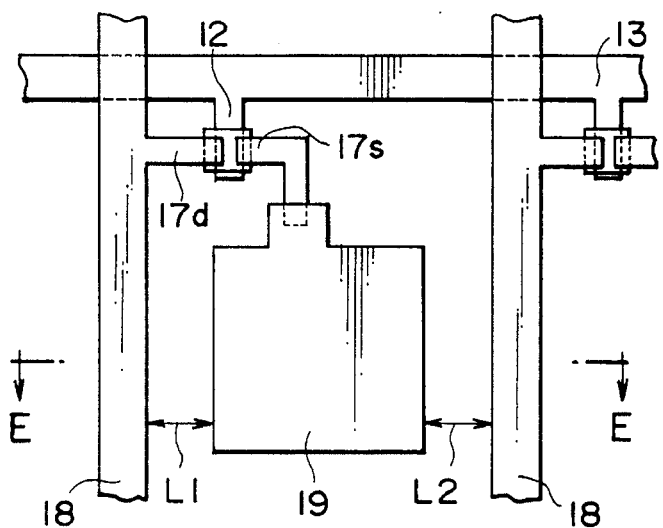
FIG. 1 is a schematic plan view of a conventional active matrix liquid crystal display device.
Figure 2:
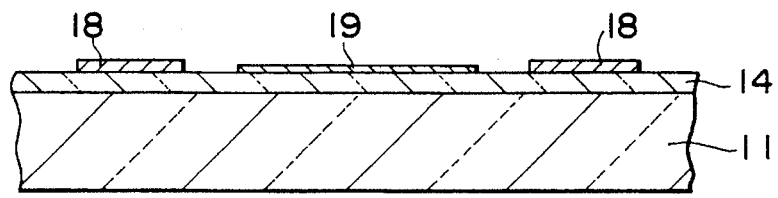
FIG. 2 is a schematic vertical sectional view taken along a line E—E of FIG. 1.
Figure 3:
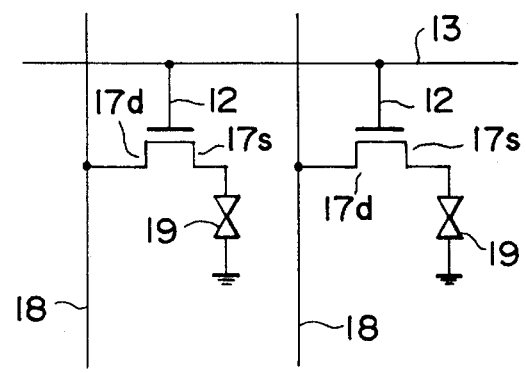
FIG 3 shows an equivalent circuit of the active matrix liquid crystal display device illustrated in FIG. 1.

Referring to the FIGS. 1 to 3, a conventional liquid crystal display device will be described for a better understanding of this invention. The liquid crystal display device is equivalent to the conventional display device described in the preamble of the instant specification. The liquid crystal display device comprises a liquid crystal panel comprising a matrix of thin-film transistors. The matrix is arranged on a glass substrate 11. Each of the thin-film transistors has a gate electrode 12, a source electrode 17s, and a drain electrode 17d. The gate electrodes 12 of the thin-film transistors are formed on the glass substrate 11. Gate lines or buses 13 are also formed on the glass substrate 11 so as to be connected to the gate electrodes 12.

A gate insulating film 14 is formed on the gate electrodes 12, the gate lines 13, and a remaining surface of the glass substrate 11. Display electrodes 19 are formed on the gate insulating film 14 so as to be connected to the source electrodes 17s of the thin-film transistors, respectively. The display electrodes 19 are connected to the ground. Each of the display electrodes 19 is made of a transparent conductive film of, for example, indium tin oxide and serves as a pixel or dot. Drain lines or buses 18 are formed on the gate insulating film 14 so as to be connected to the drain electrodes 17d of the thin-film transistors, respectively. Each of the drain lines 18 is made of a metal of, for example, aluminum or chrome.

In the display device, the thin-film transistors selectively operate by supplying a drive signal to the desired drain lines 18. As a result, a predetermined voltage is applied to the display electrode 19 to display the pixel. In this event, the drain line 18 is supplied with an alternating or inverting voltage signal having a frequency which is equal to a scanning frequency of display. The scanning frequency is typically 40 kHz for VGA display. As shown in the art, a dot-invert driving method is effective in driving the drain lines 18 so that the display device carries out the display with flicker reduced. In the dot-invert driving method, positive and negative polarity voltages are supplied to a particular drain line of the drain lines 18 and an adjacent drain line of the drain lines 18, respectively, at a time instant. The adjacent drain line is adjacent to the particular drain line. At a subsequent instant in time, the negative and the positive polarity voltages are supplied to the particular and the adjacent drain lines 18, respectively.

In the display device, the display electrodes 19 and the drain lines 18 are formed at different patterning steps in the manner described in the preamble of the instant specification. This is because the display electrodes 19 are different in material from the drain lines 18. As a consequence, positioning errors unavoidably occur between the drain lines 18 and the display electrodes 19. In other words, a difference occurs between distances L1 and L2 (FIG. 1), where L1 represents a distance between the drain line 18 and the display electrode 19 for each of the thin-film transistors, L2 representing a distance between the display electrode 19 for the thin-film transistor in question and the drain line 18 for an adjacent one of the thin-film transistors that is adjacent to the display electrode 18 for the thin-film transistor in question. This results in non-uniformity of capacitances defined by the distances L1 and L2. As known in the art, the non-uniformity of the capacitances results in the degradation of in display quality of the display device when the display device is driven using the dot-invert driving method.

Figure 4:
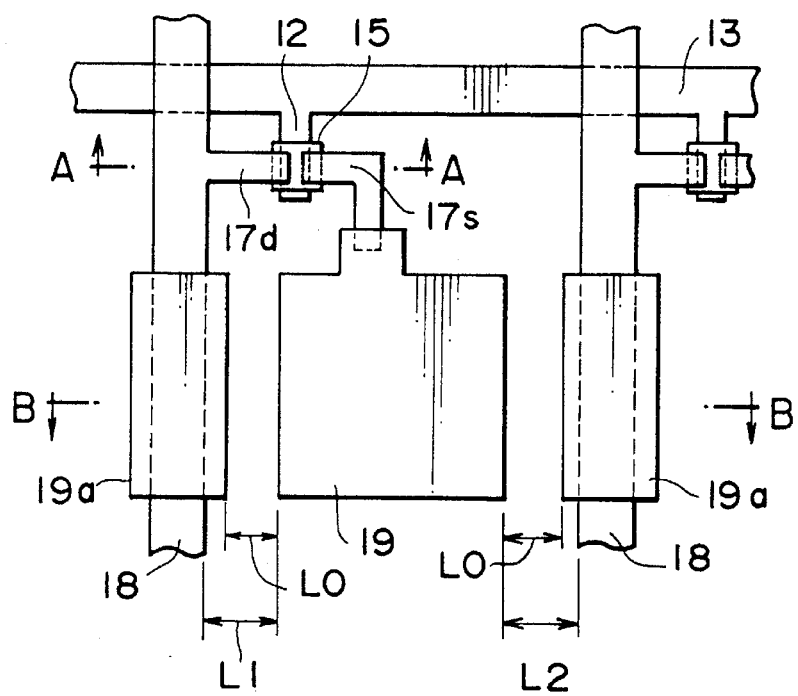
FIG. 4 is a schematic plan of an active matrix liquid crystal display device according to a first embodiment of this invention.
Figure 5:
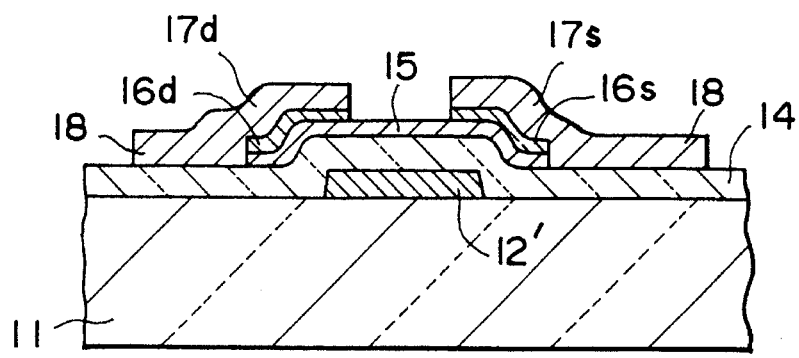
FIG. 5 is a schematic vertical sectional view taken along a line A—A of FIG. 4.
Figure 6:
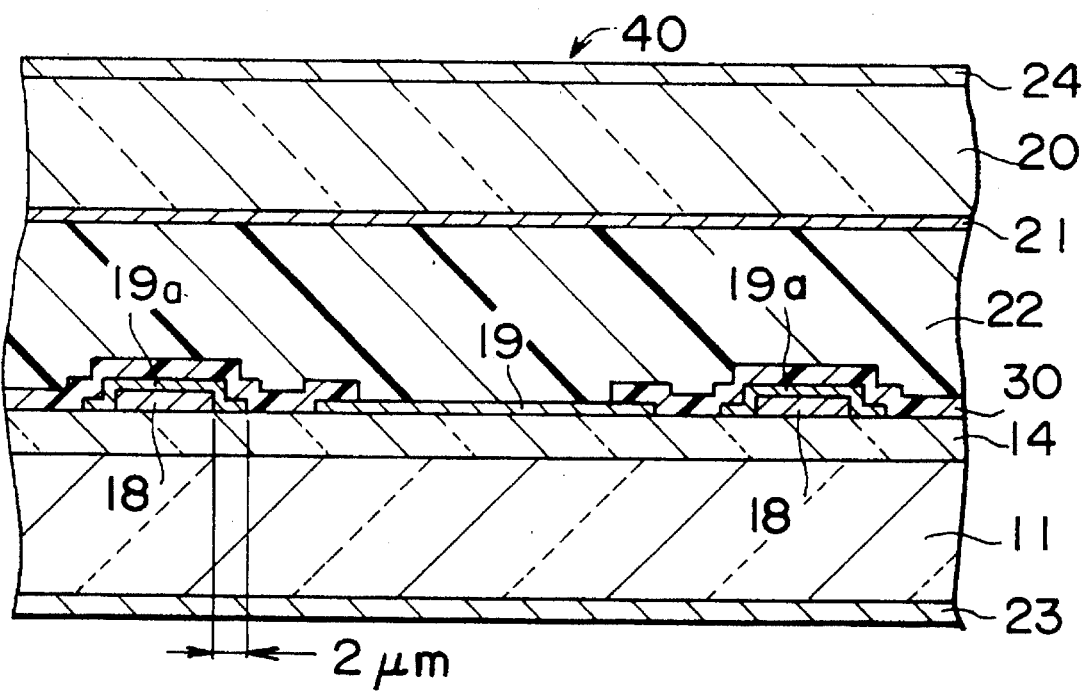
FIG. 6 is a vertical sectional taken along a line B—B.

Turning to FIGS. 4 to 6, the description will proceed to an active matrix liquid crystal display device according to a first embodiment of this invention. The display device comprises similar parts designated by like reference numerals. The active matrix liquid crystal display device comprises a liquid crystal panel 40 (FIG. 6) comprising the glass substrate 11. A gate layer 12', the gate electrodes 12, and the gate lines 13 are formed on the glass substrate 11. The gate insulating film 14 is formed on the gate layer 12', the gate electrodes 12, the gate lines 13, and a remaining surface of the glass substrate 11. An amorphous silicon layer 15 is formed on a part of the gate insulating film 14 that is positioned above the gate layer 12'. A source layer 16s and a drain layer 16d are formed on the amorphous silicon layer 15. The source and the drain electrodes 17s and 17d of, for example, chrome are formed on the source and the drain layers 16s and 16d respectively. Each of the source and the drain electrodes 17s and 17d has a thickness of, for example, 140 nm.

The drain lines 18 are formed on the gate insulating film 14. Each of the drain lines 18 is of a first conductive material of, for example, chrome or aluminum and has a first predetermined width.

The display electrodes 19 are formed on the gate insulating film 14. Each of the display electrodes 19 is a transparent conductive film of a second conductive material which is different from the first conductive material. The second conductive material is, for example, indium tin oxide.

Each of compensating lines 19a (FIGS. 4 and 6) is of the second conductive material and has a second predetermined width which is wider than the first predetermined width. The compensating lines 19a are formed on the drain lines 18 simultaneously with the display electrodes 19 with both peripheral parts of the compensating line 19a for each of the thin-film transistors formed on the gate insulating film 14. A predetermined distance LO is defined between the display electrode 19 and the compensating 19a for each of the thin-film transistors, and between the display electrode 19 for one of the thin-film transistors and the compensating line 19a for an adjacent one of the thin-film transistors. The adjacent one of the thin-film transistors is nearer to the display electrode 19 for the thin-film transistor under consideration rather than the drain line 18 for the thin-film transistor under consideration. Each of the peripheral parts of the compensating line 19a is formed on the gate insulating film 14 by, for example, 2 μm as shown in FIG. 6.

The compensating lines 19a compensate for non-uniformity of capacitances between the drain line 18 and the display electrode 19 for each of the thin-film transistors and between the display electrode 19 for one of the thin-film transistors and the drain line 18 for the adjacent one of the thin-film transistors.

In FIG. 6, an insulating film 30 is selectively formed on the compensating films 19a and the drain lines 18. The liquid crystal panel comprises another glass substrate 20 having a lower surface on which a transparent opposite electrode 21 is formed. A liquid crystal 22 is filled between the display electrodes 19 and the transparent opposite electrode 21 and between the insulating film 30 and the transparent opposite electrode 21.

Figure 7:
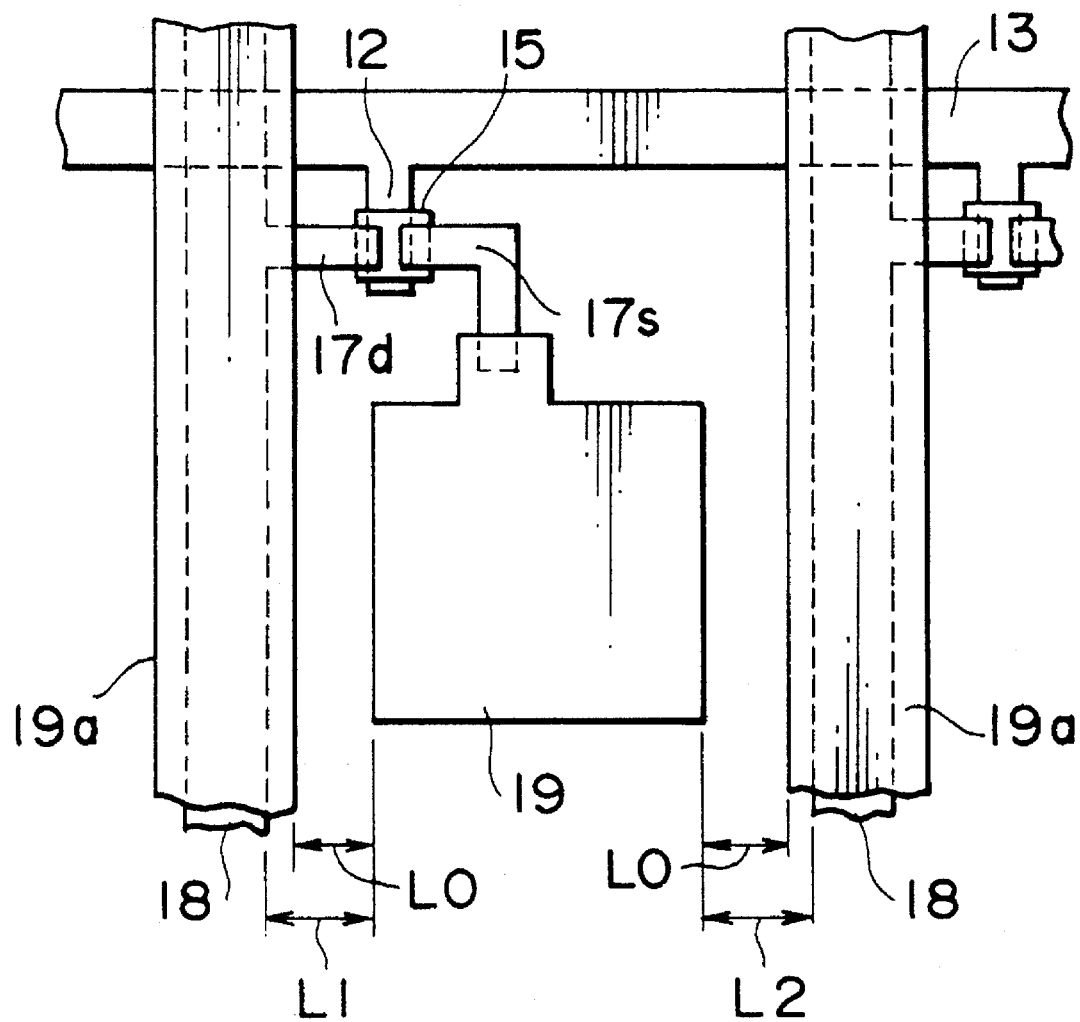
FIG. 7 is a schematic plan view of an active matrix liquid crystal display device according to a second embodiment of this invention.

Turning to FIG. 7, the description will proceed to an active matrix liquid crystal display device according to a second embodiment of this invention. The display device is similar to the display device of FIG. 4 except that the compensating lines 19a are formed on entire surfaces of the drain lines 18. The compensating lines 19a are formed on restricted surfaces of the drain lines 18 of the display device of FIG. 4. The restricted surfaces of the drain lines 18 correspond to the display electrodes 19 in the display device of FIG. 4.

Figure 8:
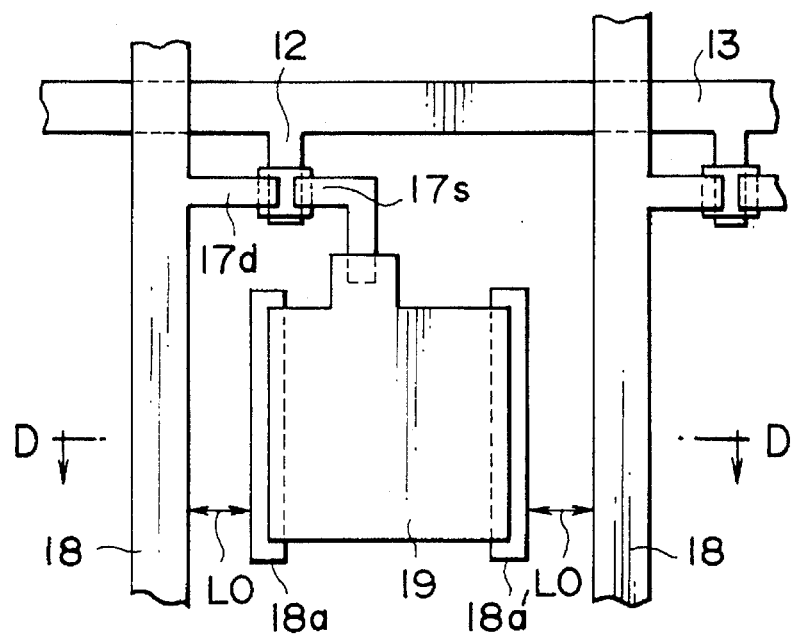
FIG. 8 is a schematic plan view of an active matrix liquid crystal display device according to a third embodiment of this invention.
Figure 9:
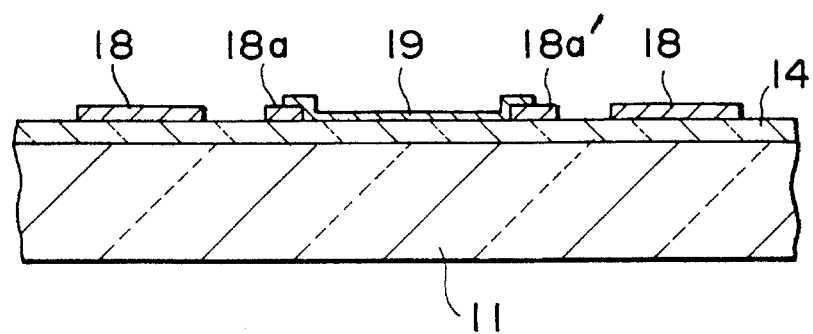
FIG. 9 is a schematic vertical sectional view taken along a line D—D of FIG. 8.

Turning to FIGS. 8 and 9, a description will be made as regards an active matrix liquid crystal display device according to a third embodiment of this invention. The display device comprises similar parts designated by like reference numerals.

The drain lines 18 are formed on the gate insulating film 14 and connected to the drain electrodes 17d of the thin-film transistors, respectively. Each of the drain lines 18 is of the first conductive material.

Each of first compensating lines 18a is of the first conductive material. The first compensating lines 18a are formed on the gate insulating film 14 simultaneously with the drain lines 18 with a predetermined distance LO left between the drain line 18 and the first compensating line 18a for each of the thin-film transistors.

Each of second compensating lines 18a' is made of the first conductive material. The second compensating lines 18a' are formed on the gate insulating film 14 simultaneously with the drain lines 18 and the first compensating line 18a with the second compensating line 18a' for each of the thin-film transistors located farther from the drain line 18 for each of the thin-film transistors than the first compensating line 18a for each of the thin-film transistors. The predetermined distance LO is defined between the second compensating line 18a' for one of the thin-film transistors and the drain line 18 for an adjacent one of the thin-film transistors. The adjacent one of the thin-film transistors is nearer to the second compensating line 18a' for the thin-film transistor in question rather than the drain line 18 for the thin-film transistor in question.

Each of the display electrodes 19 is made of the second conductive material. The display electrodes 19 are formed on the gate insulating film 14 so that the display electrode 19 for each of the thin-film transistors is positioned between the first and the second compensating lines 18a and 18a'. The display electrode 19 for each of the thin-film transistors are is furthermore formed on the first and the second compensating lines 18a and 18a' for each of the thin-film transistors so that both peripheral parts of the display electrode 19 for each of the thin-film transistors are overlaid on inner peripheral parts of the first and the second compensating lines 18a and 18a' for each of the thin-film transistors.

The first and the second compensating lines 18a and 18a' compensate for non-uniformity of capacitances between the drain line 18 and the display electrode 19 for each of the thin-film transistors and between the display electrode 19 for one of the thin-film transistors and the drain line 18 for the adjacent one of the thin-film transistors.

What is claimed is:

1. An active matrix liquid crystal display device including a glass substrate and a plurality of thin-film transistors formed on said glass substrate in a matrix form, each of said thin-film transistors comprising:

a semiconductor film;

a gate electrode;

a gate insulating film intervening between said gate electrode and said semiconductor film;

a first electrode formed in contact with said semiconductor film;

a second electrode formed in said semiconductor film apart from said first electrode;

a first bus line arranged in a row direction in contact with said gate electrode;

a second bus line arranged in a column direction in contact with said first electrode;

a display electrode formed in contact with said second electrode along said second bus line apart from said second bus line; and a compensating conductive layer formed in contact with one of said second bus line and said display electrode, and having a portion projecting from said one of said second bus line and said display electrode towards the other of said second bus line and said display electrode to thereby keep a distance between said portion of said compensating conductive film and said other of said second bus line and said display electrode constant, wherein said compensating conductive film is formed under said display electrode in contact therewith and made of material that is equal to material of said second bus line.

2. An active matrix liquid crystal display device comprising a liquid crystal panel comprising:

an insulating film;

a plurality of thin-film transistors formed on said insulating film, each of said thin-film transistors having a drain electrode and a source electrode;

drain lines, each being of a first conductive material, said drain lines being formed on said insulating film and connected to the drain electrodes of said thin-film transistors, respectively;

first compensating lines, each being of said first conductive material, said first compensating lines being formed on said insulating film simultaneously with said drain lines with a predetermined distance left between the drain line and the first compensating line for each of said thin-film transistors;

second compensating lines, each being of said first conductive material, said second compensating lines being formed on said insulating film simultaneously with said drain lines and said first compensating lines with the second compensating line for each of the thin-film transistors located farther from the drain line for each of the thin-film transistors than the first compensating line for each of said thin-film transistors and with said predetermined distance left between the second compensating line for one of the thin-film transistors and the drain line for an adjacent one of said thin-film transistors, said adjacent one of the thin-film transistors being nearer to the second compensating line for said one of the thin-film transistors rather than the drain line for said one of the thin-film transistors; and display electrodes, each being of a second conductive material which is different from said first conductive material, said display electrodes being formed on said insulating film and connected to the source electrode of said thin-film transistors, respectively, the display electrode for each of said thin-film transistors being formed on said insulating film so that the display electrode for each of said thin-film transistors is positioned between the first and the second compensating lines for each of said thin-film transistors, the display electrode for each of said thin-film transistors being furthermore formed on the first and the second compensating lines for each of said thin-film transistors so that both peripheral parts of the display electrode for each of said thin-film transistors are overlaid on inner peripheral parts of the first and the second compensating lines for each of said thin-film transistors;

said first and said second compensating lines compensating for non-uniformity of capacitances between the drain line and the display electrode for each of said thin film transistors and between the display electrode for said one of the thin-film transistors and the drain line for said adjacent one of the thin-film transistors.

3. An active matrix liquid crystal display device as claimed in claim 2, wherein each of said display electrodes is a transparent conductive film.

4. An active matrix liquid crystal display device as claimed in claim 2, wherein said first conductive material is one selected from the group consisting of aluminum and chrome, said second conductive material being indium tin oxide.

* * * * *